United States Patent [19]
Bülow et al.

[11] Patent Number: 5,442,479
[45] Date of Patent: Aug. 15, 1995

[54] FIBER-OPTIC AMPLIFIER WITH A FACILITY FOR MONITORING THE PUMP POWER AND INPUT POWER

[75] Inventors: Henning Bülow, Ludwigsburg; Jürgen Otterbach, Leonberg, both of Germany

[73] Assignee: Alcatel SEL Aktiengesellschaft, Stuttgart, Germany

[21] Appl. No.: 264,961

[22] Filed: Jun. 24, 1994

[30] Foreign Application Priority Data

Jul. 1, 1993 [DE] Germany ............... 43 21 856.3

[51] Int. Cl.[6] ........................................... H04B 10/02
[52] U.S. Cl. .................................. 359/341; 359/110; 359/177
[58] Field of Search ............. 359/341, 110, 177

[56] References Cited

U.S. PATENT DOCUMENTS

| | | | |
|---|---|---|---|
| 4,887,309 | 12/1989 | Anderson et al. | 455/601 |
| 5,295,015 | 3/1994 | Yoneyama | 359/333 |
| 5,299,048 | 3/1994 | Suyama | 359/179 |
| 5,315,674 | 5/1994 | Asako | 385/15 |
| 5,345,332 | 9/1994 | daSilva et al. | 359/341 |

FOREIGN PATENT DOCUMENTS

| | | |
|---|---|---|
| 0395277 | 10/1990 | European Pat. Off. . |
| 0507367 | 10/1992 | European Pat. Off. . |
| 0517503 | 12/1992 | European Pat. Off. . |

OTHER PUBLICATIONS

"Progress in Optical Amplification", J. Augé et al, *Electrical Communication*, 4th Quarter 1992, pp. 37–44.

"Optische Nachrichtentechnik", G. Grau, Springer–Verlag, Berlin, Heidelberg, New York, Tokyo, 3nd Ed. 1986, pp. 296–302.

Patent Abstracts of Japan, vol. 17, No. 706 (E–1483) Dec. 22, 1993 & JP-A-05243641 (NEC Corp) Sep. 21, 1993.

*Primary Examiner*—Mark Hellner
*Attorney, Agent, or Firm*—Ware, Fressola, Van Der Sluys & Adolphson

[57] ABSTRACT

In fiber-optic amplifiers, various parameters, such as the input power, are measured to obtain information on the operating condition of the transmission link and of the fiber-optic amplifier itself. In prior art fiber-optic amplifiers, a portion of the input power is coupled out for this purpose by means of a coupler (2). If low-power optical signals such as digital signals are transmitted, the coupled-out portion of the input power can only be detected with complicated and costly circuitry. In the novel fiber-optic amplifier, the pump power and input power are monitored by coupling out and evaluating the radiation resulting from amplified spontaneous emission (ASE). This provides information on the state of the input signal.

9 Claims, 3 Drawing Sheets

FIBER-OPTIC AMPLIFIER WITH A FACILITY FOR MONITORING THE PUMP POWER AND INPUT POWER

TECHNICAL FIELD

The present invention relates to a fiber-optic amplifier.

BACKGROUND OF THE INVENTION

Fiber-optic amplifiers for amplifying an optic signal comprising a four-port coupler are known, for example, from Augé J., et al, "Fortschritte im Bereich der optischen Verstärkung", Elektrisches Nachrichtenwesen, 4th Quarter 1992, pages 37 to 44. There a fiber-optic amplifier is shown which has two pump-light sources, two pump-light couplers, and a length of optical waveguide doped with erbium ions.

In fiber-optic transmission systems, fiber-optic amplifiers serve to amplify optical signals which are guided in the optical waveguides.

Through the pump light, the erbium ions contained in the length of optical waveguide, which are in an energetic ground state, are raised into an excited state, from which they revert, through either spontaneous or stimulated emission, to the ground state. The stimulated emission is caused by the optical signal travelling through the length of optical waveguide. If no optical signal is travelling through the length of optical waveguide, the transition to the ground state will be spontaneous, with the energy difference between ground state and excited state being converted into radiation which propagates along the length of optical waveguide.

During this propagation in the length of optical waveguide, the spontaneous radiation is amplified. The radiation resulting from amplified spontaneous emission (ASE) emerges at the two ends of the length of optical waveguide. This radiation will hereinafter be referred to as "ASE". In the case of erbium-doped fiber-optic amplifiers, the wavelength of this ASE is in the range around 1550 nm. It thus lies in the wavelength range of the optical signal.

In such transmission systems it is important to have information on the transmission link and on the operating states of the fiber-optic amplifiers in order to safeguard the transmission itself and ensure the necessary transmission quality.

This includes information as to whether input power is present for the fiber-optic amplifier and how high the output power of the latter is.

If no input power is present, this may point to a fiber break, for example. In that case it must be ensured that the transmission link is "eye-safe" i e that there is no potential hazard to the eye of a person looking, intentionally or unintentionally, into a broken optical waveguide. To guarantee this, the system or individual parts thereof must be shut down in the event of a fiber break.

From the above literature it is known to monitor the input and output power of a fiber-optic amplifier in order to control the amplifier's gain. Portions of the input and output power are coupled out by couplers forming part of the fiber-optic amplifier, and detected by photodiodes.

During the transmission of analog signals, such as TV signals, high signal power levels prevail. The coupled-out signal power can be detected with simple circuitry.

Things are different if the signal power is lower, as is the case in digital transmission systems, for example. The coupled-out signal power is correspondingly lower, and the amount of circuitry required to detect this low signal power increases.

DISCLOSURE OF INVENTION

It is an object of the invention to provide a fiber-optic amplifier in which even low input power levels can be monitored without the need for complicated and costly circuitry.

According to the present invention, a fiber-optic amplifier for amplifying an optical signal comprises a four-port coupler, wherein for the reception of light in the wavelength region of the optical signal, an optical-to-electrical transducer is provided which is connected to a port of the coupler from which emerges a portion of the light which propagates in the fiber-optic amplifier in a direction opposite to that of the optical signal.

According further to the present invention, a fiber-optic amplifier for amplifying an optical signal comprises a four-port coupler and a first optical-to-electrical transducer which is connected to a port of the coupler from which a portion of the optical signal emerges, wherein for the reception of light in the wavelength region of the optical signal, a second optical-to-electrical transducer is provided which is connected to a port of the coupler from which emerges a portion of the light which propagates in the fiber-optic amplifier in a direction opposite to that of the optical signal.

One advantage of the invention is that it is possible to clearly distinguish between a fiber break and a disconnected transmit laser. Another advantage is that the actual pump power can be monitored provided that the input is disabled.

These and other objects, features and advantages of the present invention will become more apparent in light of the detailed description of a best mode embodiment thereof, as illustrated in the accompanying drawing.

BEST MODE FOR CARRYING OUT THE INVENTION

Figure 1:
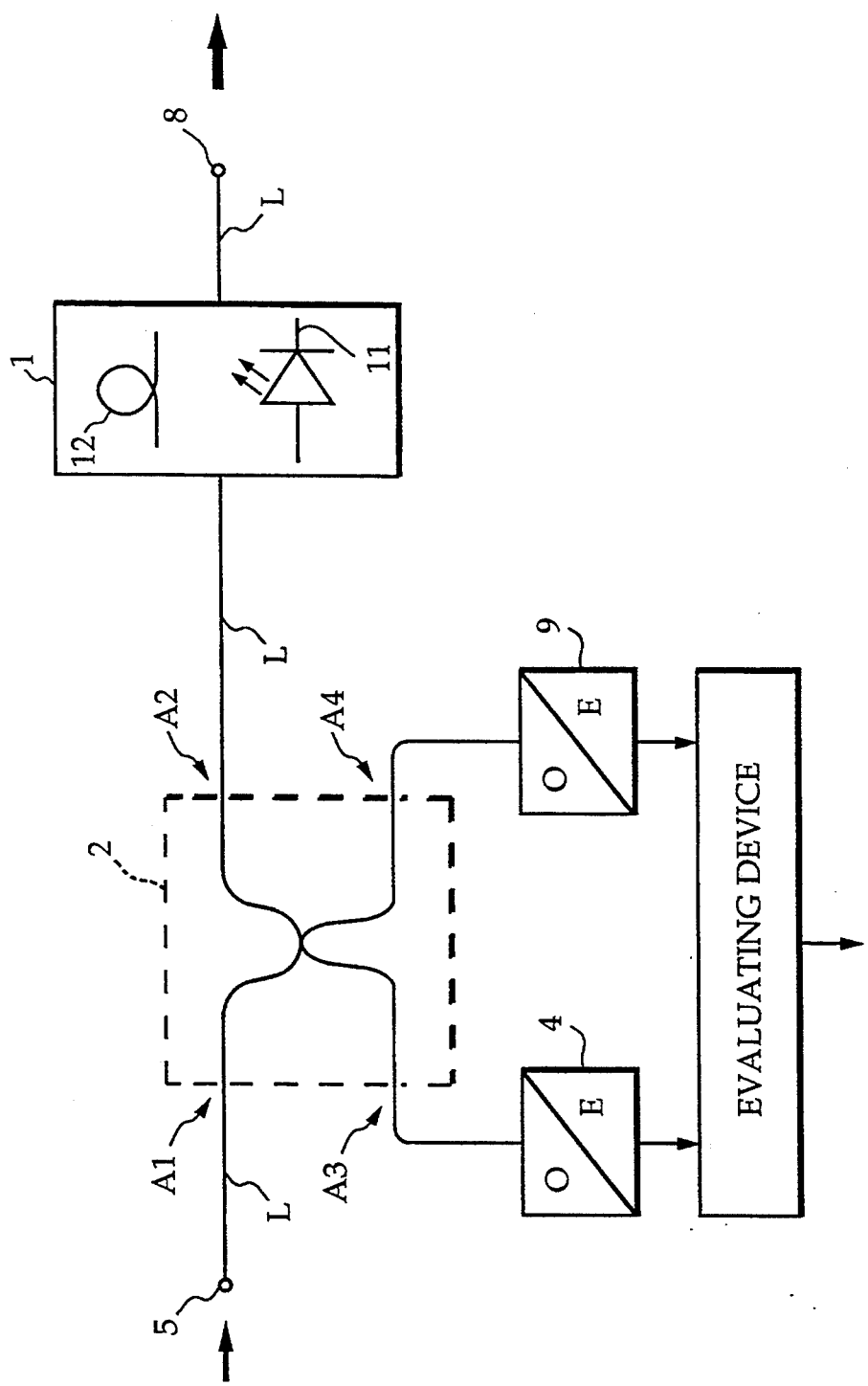
FIG. 1 shows a first embodiment of a fiber-optic amplifier according to the present invention.

FIG. 1 shows the basic construction of a fiber-optic amplifier as far as it is relevant to the invention. Its amplifying portion 1, containing a doped length of optical waveguide 12 and a pump-light source 11, is shown schematically; more detailed representations are contained in the literature, e.g., Augé J. referred to above. Any optical isolators and power supplies that may be present are not shown.

An optical signal to be amplified enters the fiber-optic amplifier at an input 5 and leaves the amplifier as an amplified signal at an output 8. The amplification and direction of the optical signal are indicated by arrows of different size at the input and output of the fiber-optic amplifier.

The fiber-optic amplifier further includes a coupler 2 with four ports A1 to A4, a first optical-to-electrical transducer 4, and a second optical-to-electrical transducer 9. Such couplers are described, for example, in Grau, G., "Optische Nachrichtentechnik", zweite Auflage, Berlin, Heidelberg, New York, Tokyo, Springer Verlag, 1986, pages 296 to 302.

The optical signal to be amplified is fed through the input 5 of the fiber-optic amplifier into port A1 of the coupler 2. Port A2 of the coupler 2 is connected to the amplifying portion 1, which amplifies the optical signal. The amplified optical signal is available at the output 8 of the fiber-optic amplifier, which is connected to the amplifying portion 1. Between the amplifying portion 1 and the output 8 a coupler and an optical isolator may be provided, which are not shown.

The first optical-to-electrical transducer 4 is connected to port A3 of the coupler 2, from which emerges light that propagates in a direction opposite to that of the signal.

The second optical-to-electrical transducer 9 is connected to port A4 of the coupler 2, from which emerges a portion of the light that propagates in the fiber-optic amplifier in the direction of the signal. The individual components are interconnected via optical waveguides or fibers L.

For simplicity, the term "light" is used for any optical radiation, visible or invisible. The second embodiment of a fiber-optic amplifier, shown in FIG. 2, differs from that of FIG. 1 only in that the second optical-to-electrical transducer 9 is not present.

Figure 2:
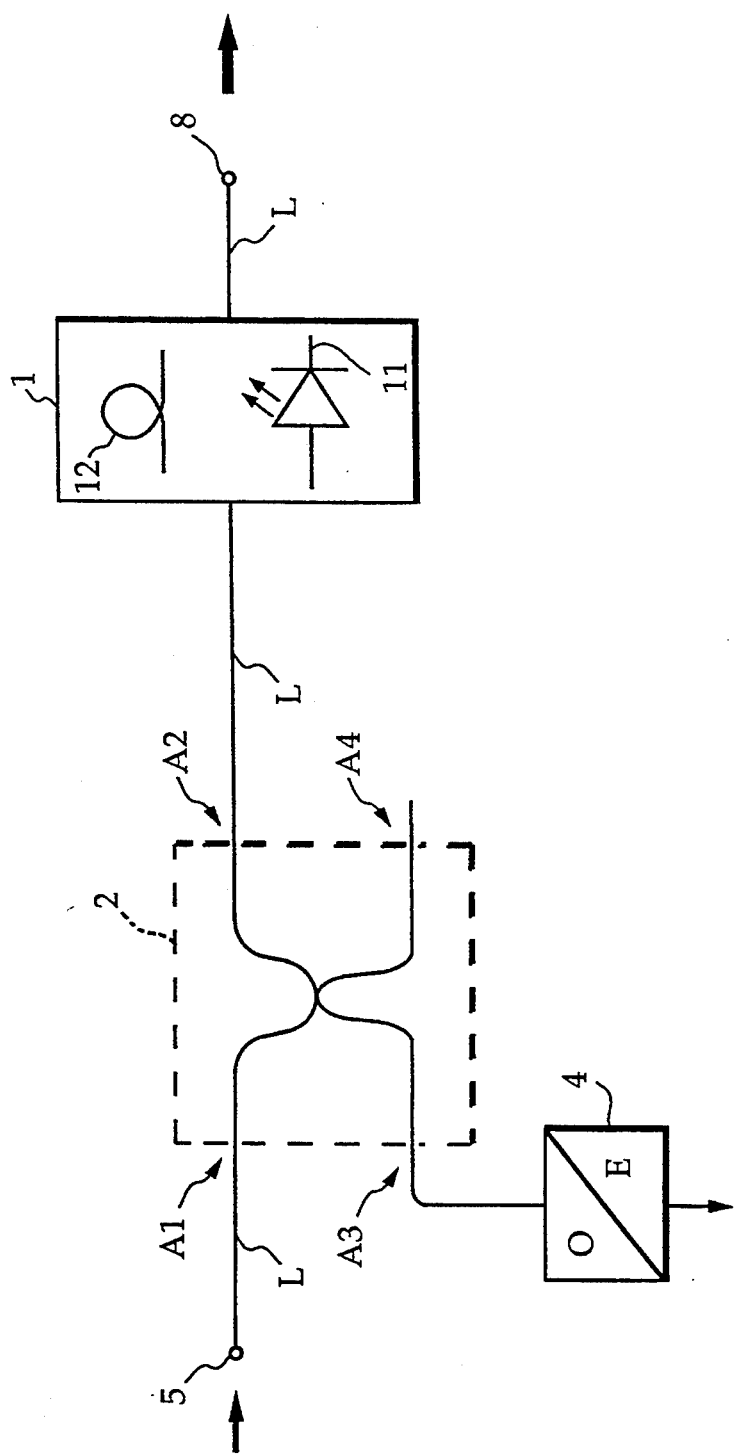
FIG. 2 shows a second embodiment of a fiber-optic amplifier, according to the present invention.

The electric signal appearing at the output of an optical-to-electrical transducer 4, 9 of FIGS. 1 and 2 is evaluated in a microprocessor provided in the fiber-optic amplifier for electronic control. This is indicated by the arrow emanating from the transducer 4, 9.

Figure 3:
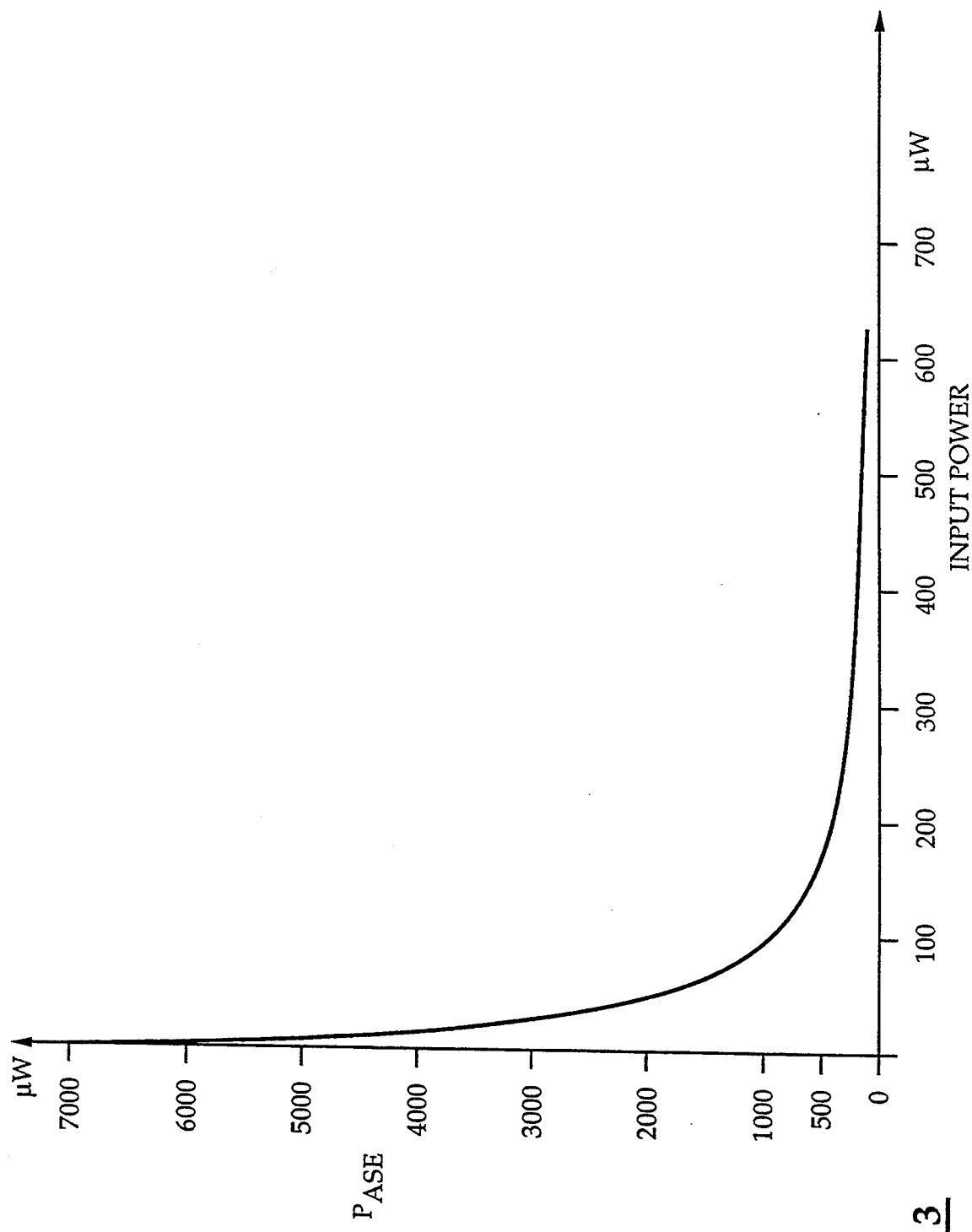
FIG. 3 is a graph, according to the teachings of the present invention showing the ASE power detected at port 3 as a function of the input power.

FIG. 3 shows the dependence of the ASE power $P_{ASE}$ on the input power of the fiber-optic amplifier. The ordinate represents the ASE power $P_{ASE}$ in $\mu W$, which propagates in a direction opposite to that of the optical signal, and the abscissa represents the input power of the fiber-optic amplifier in $\mu W$. The ASE power decreases with increasing input power, as shown.

In each of the embodiments shown, port A3 outputs a portion of the light which propagates in the fiber-optic amplifier in a direction opposite to that of the optical signal. This light is ASE, for example, but in addition, unabsorbed pump light may emerge from that port if the pump light is injected in a direction opposite to that of the optical signal. In that case, the pump light can be blocked by a wavelength-selective filter ahead of the optical-to-electrical transducer 4, so that only ASE will be detected.

Port A4 of the coupler 2 outputs a portion of the light which propagates in the fiber-optic amplifier in the direction of the optical signal. The portion emerging from port A4 of this light is detected by the optical-to-electrical transducer 9. In the fiber-optic amplifiers mentioned at the beginning, this is used to monitor the input power.

The detected signals are evaluated as follows:

Since ASE occurs only when the length of optical waveguide is being pumped, the pump power can be checked when the input power is intentionally cut off. If a high ASE power is measured with the input power cut off, this means that the pump source is operating properly. FIG. 3 shows that an ASE power of 6500 $\mu W$ is measured if the input power is zero. The ASE power decreases with decreasing pump power.

The measurement of the ASE power provides not only yes-or-no information but also quantitative information on the input power. At an ASE power of 1000 $\mu W$, the input power is approximately 100 $\mu W$.

As shown in FIG. 3, the ASE power is high at low input power levels. It is advantageous that this high ASE power is easier to detect than low input power.

A particular advantage of the first embodiment (FIG. 1) is that it permits the detection of a fiber break:

If a fiber breaks before the input 5, part of the ASE (approximately 4% in the case of a straight fracture) will be reflected at the point of fracture, and the optical-to-electrical transducer 9 will falsely detect input power. If, however, the optical-to-electrical transducer 4 simultaneously detects a high ASE power, this means that the actual input power is very low or even zero. By evaluating the electric signals from the optical-to-electrical transducers 4, 9, a fiber break can be positively detected. If both the first optical-to-electrical transducer 9 and the second optical-to-electrical transducer 4 provide an electric signal greater than a threshold value, an evaluating device (microprocessor) will deliver a signal which indicates a fiber break.

Based on this information, action can be taken in the transmission system, i.e., in the event of a fiber break, for example, the system can be shut down, wholly or in part.

Although the invention has been shown and described with respect to a best mode embodiment thereof, it should be understood by those skilled in the art that the foregoing and various other changes, omissions and additions in the form and detail thereof may be made therein without departing from the spirit and scope of the invention.

We claim:

1. A fiber-optic amplifier for amplifying an optical signal and monitoring faults in a fiber-optic transmission system, comprising:
   a four-port coupler (2) having a port (A1) for receiving the optical signal;
   an amplifying portion (1) connected to a port (A2) of the coupler (2) from which a portion of the optical signal emerges; and
   an optical-to-electrical transducer (4) for the reception of light in a wavelength region of the optical signal, said optical-to-electrical transducer being connected to a port (A3) of the coupler (2) from which emerges a portion of light which propagates in the fiber-optic amplifier in a direction opposite to that of the optical signal.

2. A fiber-optic amplifier for amplifying an optical signal and for monitoring faults in a fiber-optic transmission system, the fiber-optic amplifier having an input (5) where the optical signal is input, and an output (8) where an amplified optical input signal is provided, the fiber-optic amplifier comprising:
   a four-port coupler (2) connected by a port (A1) to the fiber-optic amplifier input (5);
   an amplifying portion (1) connected between a port (A2) of the coupler (2) from which a portion of the optical signal emerges and the fiber-optic amplifier output (8);
   a first optical-to-electrical transducer (9) which is connected to a port (A4) of the coupler (2) from which a portion of the optical signal emerges; and
   a second optical-to-electrical transducer (4) for the reception of light in a wavelength region of the optical signal, said second optical-to-electrical transducer being connected to a port (A3) of the coupler (2) from which emerges a portion of light which propagates in the fiber-optic amplifier in a direction opposite to that of the optical signal.

3. A fiber-optical amplifier as claimed in claim 2, wherein an evaluating device is provided which indicates a fiber break if the first and second optical-to-electrical transducers (9, 4) provide an electrical signal greater than a threshold value.

4. A fiber-optic amplifier as claimed in claim 1, further comprising a second optical-to-electrical transducer (9) which is connected to a port (A4) of the coupler (2) from which a portion of the optical signal emerges.

5. A fiber-optic amplifier as claimed in claim 4, further comprising an evaluating device which indicates a fiber break if both of said optical-to-electrical transducers (9, 4) provide an electrical signal greater than a threshold value.

6. A fiber-optic amplifier as claimed in claim 5, further comprising an input (5) where the optical signal is input, and an output (8) where an amplified optical input signal is provided, and wherein said four-port coupler (2) is connected by the port (A1) of the coupler (2) to said input (5) and wherein said amplifying portion (1) is connected between the port (A2) of the coupler (2) and said output (8).

7. A monitoring device for monitoring faults in a fiber-optic transmission system having a fiber-optic amplifier for amplifying an optical signal, comprising:
a four-port coupler (2); and
an optical-to-electrical transducer (4) for the reception of light in a wavelength region of the optical signal, said optical-to-electrical transducer being connected to a port (A3) of the coupler (2) from which emerges a portion of light which propagates in the fiber-optic amplifier in a direction opposite to that of the optical signal.

8. A monitoring device as claimed in claim 7, further comprising a second optical-to-electrical transducer (9) which is connected to a port (A4) of the coupler (2) from which a portion of the optical signal emerges.

9. A monitoring device as claimed in claim 8, further comprising an evaluating device which indicates a fiber break if both of said optical-to-electrical transducers (9, 4) provide an electrical signal greater than a threshold value.

* * * * *